(12) United States Patent
White

(10) Patent No.: US 11,333,174 B2
(45) Date of Patent: May 17, 2022

(54) HIGH EFFICIENCY ASPIRATOR FOR INFLATABLE EMERGENCY SLIDES

(71) Applicant: ALTEVAC LLC, Boca Raton, FL (US)

(72) Inventor: Blair White, Delray Beach, FL (US)

(73) Assignee: Altevac, LLC, Boca Raton, FL (US)

( * ) Notice: Subject to any disclaimer, the term of this patent is extended or adjusted under 35 U.S.C. 154(b) by 259 days.

(21) Appl. No.: 16/027,541

(22) Filed: Jul. 5, 2018

(65) Prior Publication Data
US 2019/0010962 A1 Jan. 10, 2019

Related U.S. Application Data

(60) Provisional application No. 62/529,094, filed on Jul. 6, 2017.

(51) Int. Cl.
*F04F 5/46* (2006.01)
*B64D 25/14* (2006.01)
*F04F 5/18* (2006.01)

(52) U.S. Cl.
CPC .............. *F04F 5/466* (2013.01); *B64D 25/14* (2013.01); *F04F 5/18* (2013.01); *F04F 5/463* (2013.01)

(58) Field of Classification Search
CPC ... B05B 1/06; F04F 5/466; F04F 5/463; F04F 5/18; B64D 25/14
USPC .................................................. 417/197, 179
See application file for complete search history.

(56) References Cited

U.S. PATENT DOCUMENTS

| 1,122,733 | A | * | 12/1914 | Goodfellow | F23L 17/16 417/155 |
|---|---|---|---|---|---|
| 3,598,504 | A | | 8/1971 | Siravo | |
| 3,640,645 | A | * | 2/1972 | Forsythe | F04F 5/466 417/174 |
| 3,791,764 | A | * | 2/1974 | Summer | F04F 5/50 417/185 |
| 3,840,057 | A | | 10/1974 | Lesh, Jr. | |
| 4,368,009 | A | | 1/1983 | Heimovics, Jr. et al. | |
| 4,832,288 | A | * | 5/1989 | Kendall | B64G 1/62 244/113 |
| 6,004,176 | A | * | 12/1999 | Moran | B64D 25/14 417/191 |
| 8,066,493 | B2 | | 11/2011 | Renz et al. | |
| 2010/0202899 | A1 | * | 8/2010 | McNeil | B64D 25/14 417/189 |
| 2017/0297726 | A1 | * | 10/2017 | Volny | F04F 5/14 |

(Continued)

*Primary Examiner* — Devon C Kramer
*Assistant Examiner* — Thomas Fink
(74) *Attorney, Agent, or Firm* — Caesar Rivise, PC

(57) ABSTRACT

An aspirator assembly for inflating an emergency slide is disclosed. The aspirator assembly includes a bell housing, a mixing chamber, and a nozzle assembly. The bell housing includes a ring defining an inlet port at which a check valve is located and into which ambient air can flow. The mixing chamber has an outlet port, The nozzle assembly is located in the mixing chamber and includes plural passageway sections defining concentric rings and cross bars. The passageway sections include internal passageways in communication with plural nozzle jets through which a compressed air is introduced into the mixing chamber to mix with the ambient air. The passageway sections are of an airfoil shape cross-section having a rounded leading end directed towards the inlet port and a trailing end is directed toward the outlet port to reduce air turbulence within the mixing chamber.

4 Claims, 7 Drawing Sheets

(56) References Cited

U.S. PATENT DOCUMENTS

2017/0307212 A1* 10/2017 Kendrick ................ F23N 5/123
2019/0091704 A1*  3/2019 McEwen ................ F04F 5/461
2019/0186504 A1*  6/2019 Werbelow ............... F04F 5/467

* cited by examiner

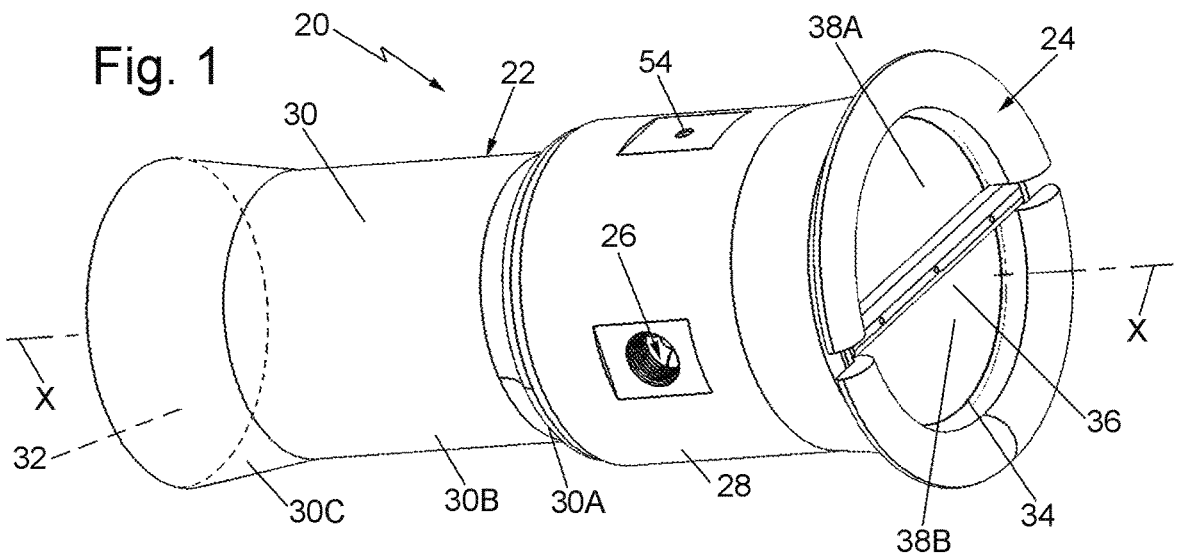
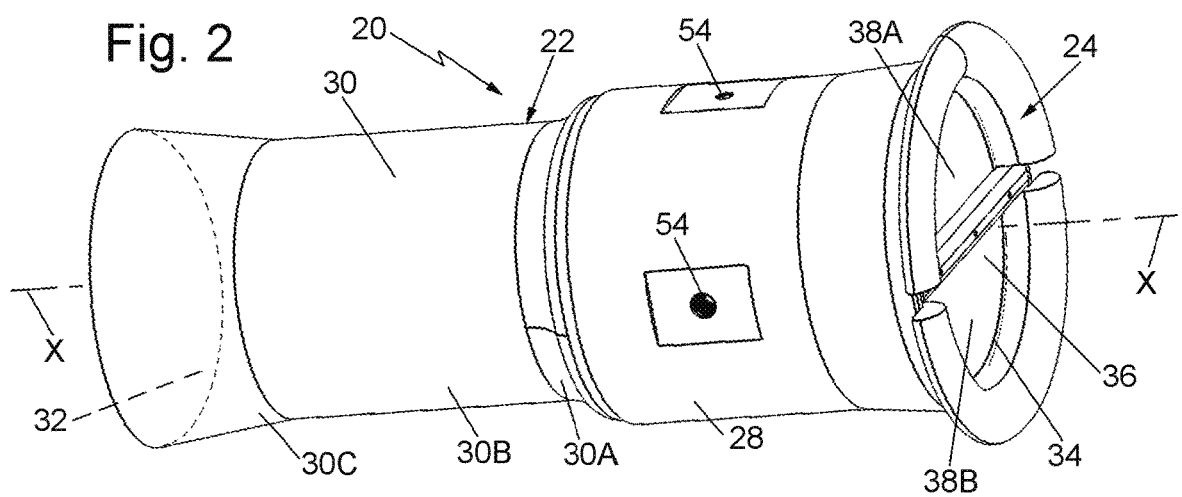
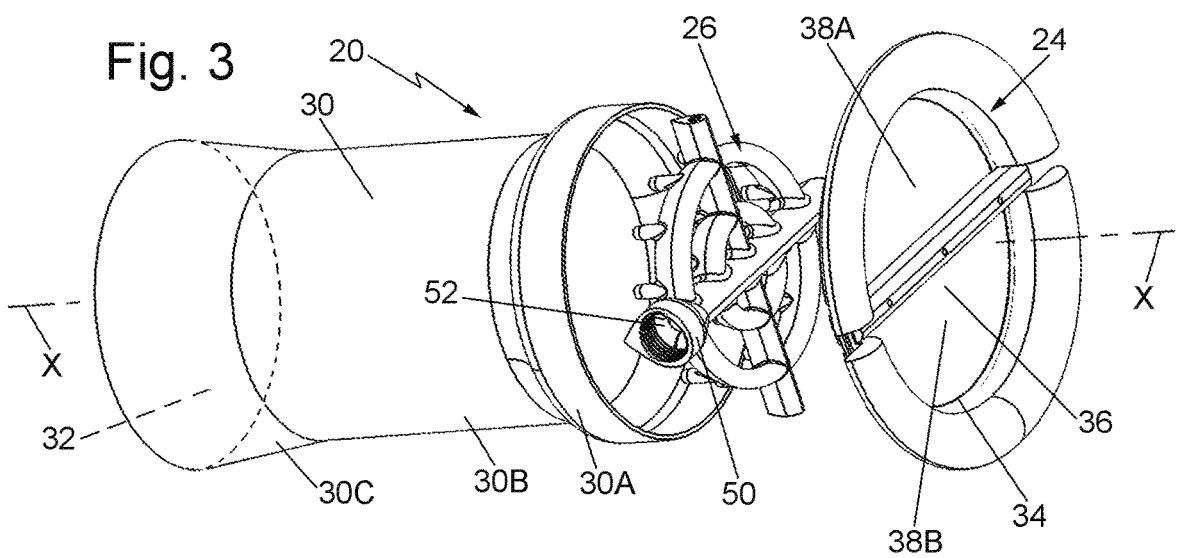

Fig. 4
Fig. 5
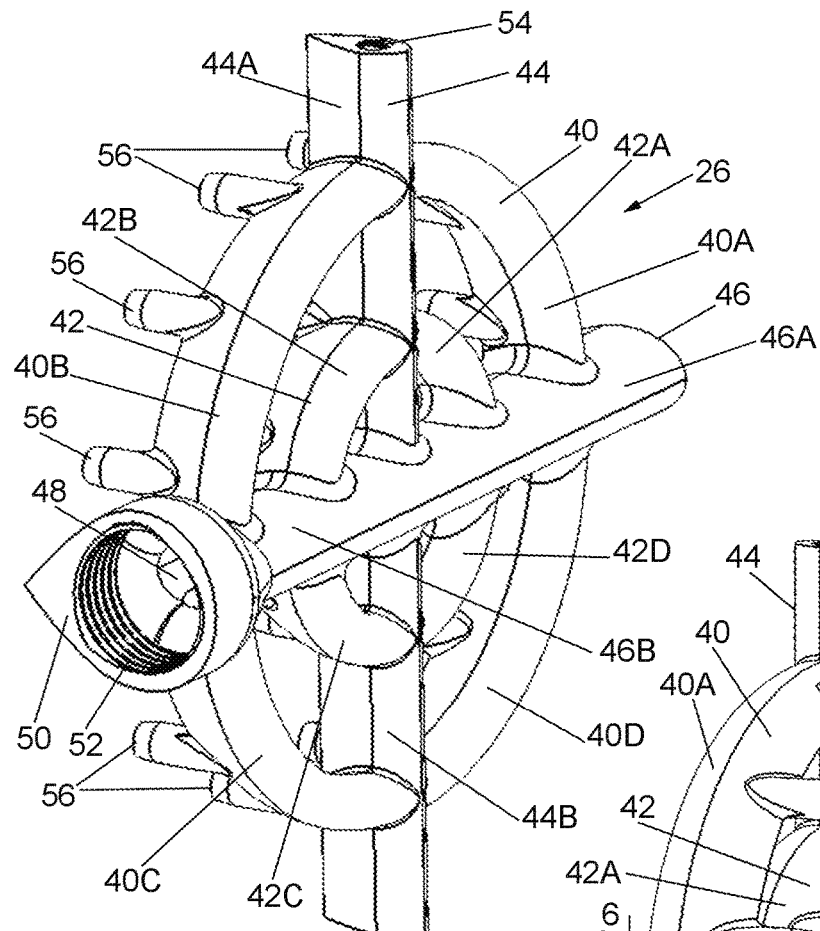
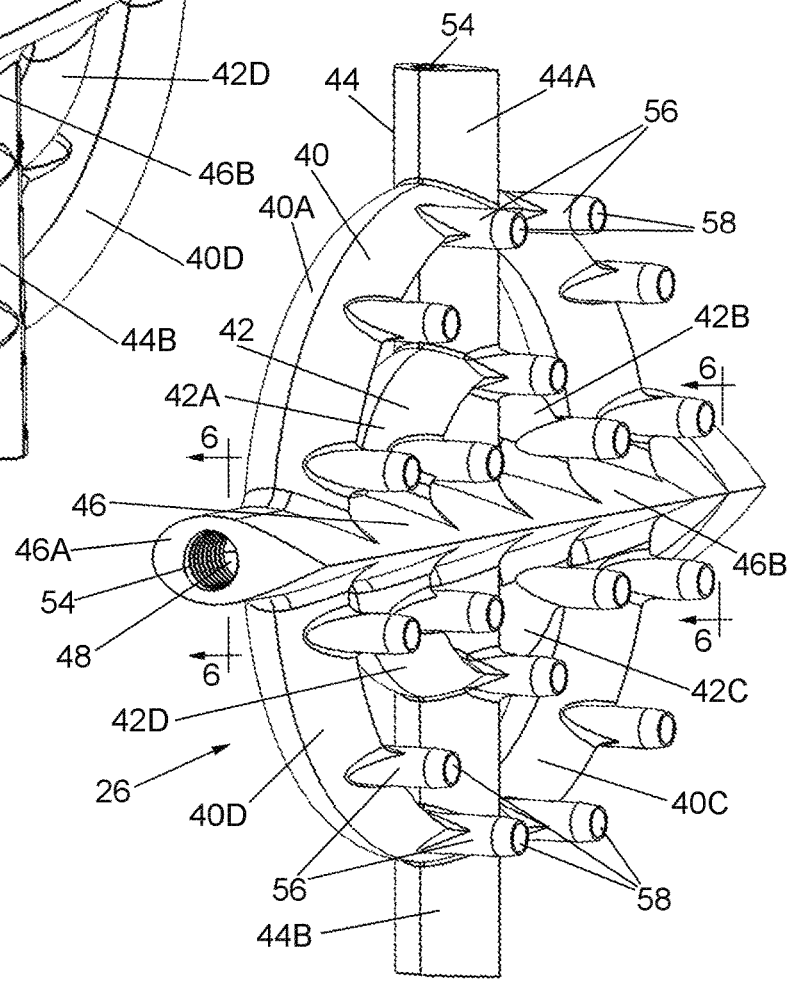

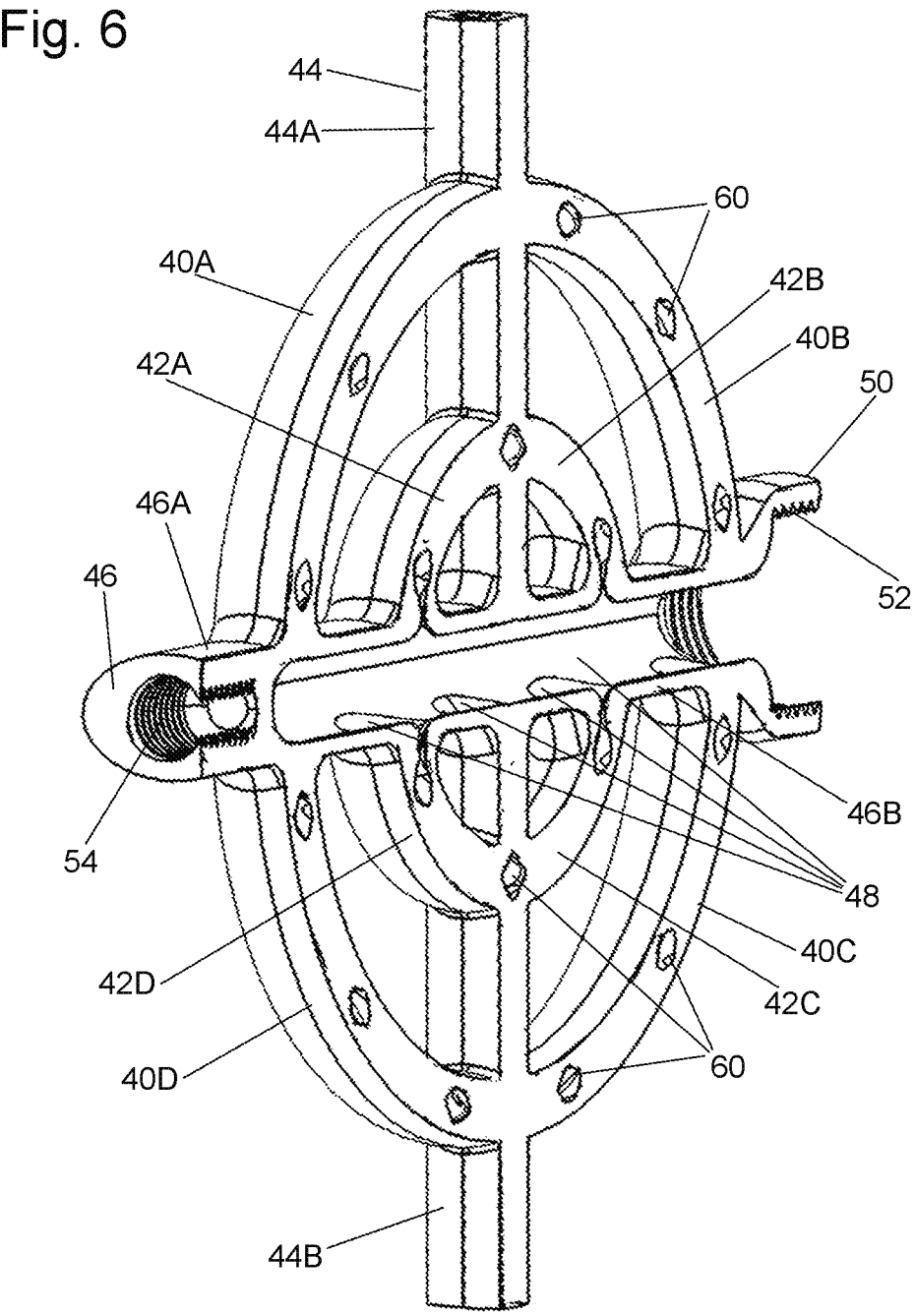

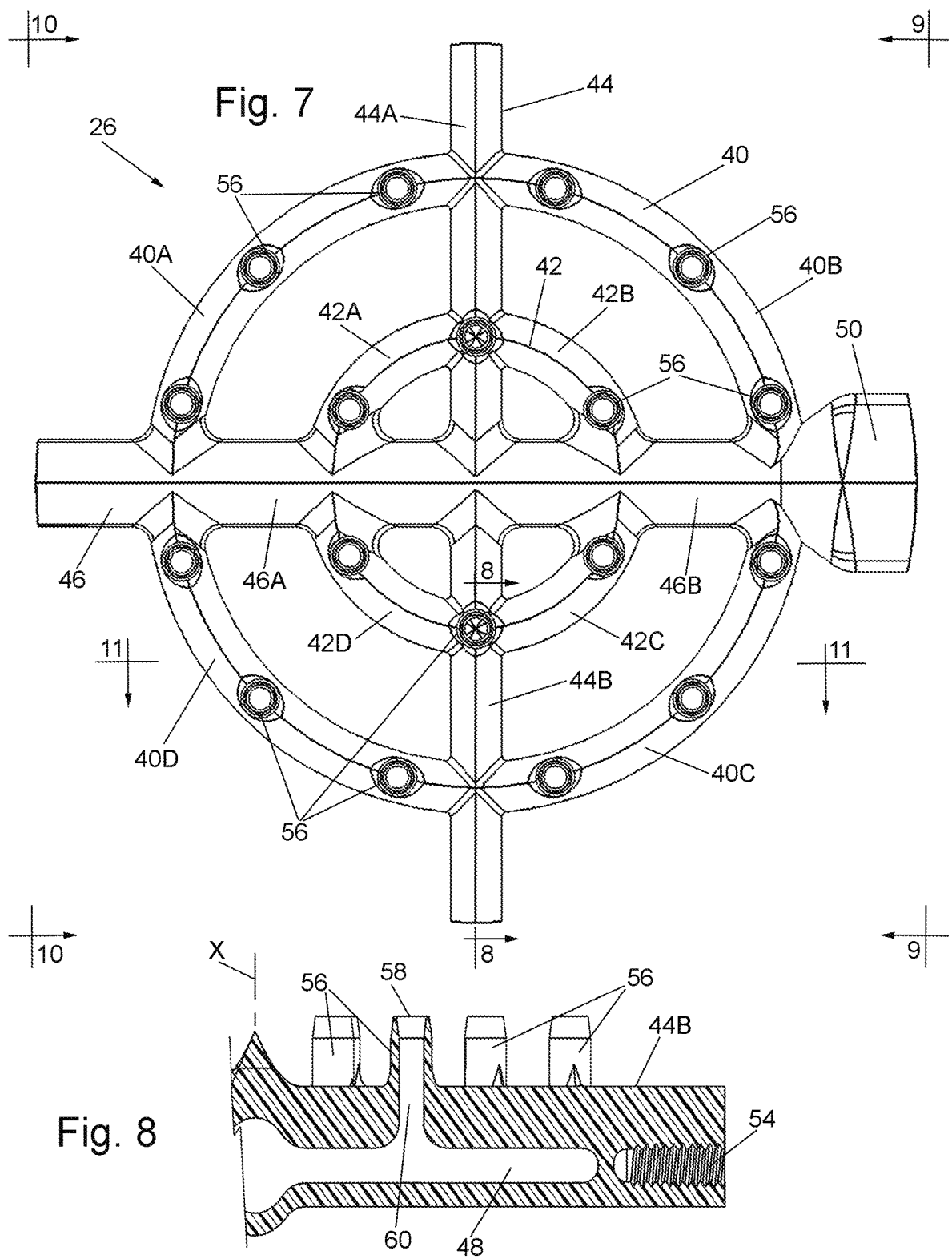

HIGH EFFICIENCY ASPIRATOR FOR INFLATABLE EMERGENCY SLIDES

CROSS-REFERENCE TO RELATED APPLICATIONS

This non-provisional application claims the benefit under 35 U.S.C. § 119(e) of Application Ser. No. 62/529,094 filed on Jul. 6, 2017 entitled HIGH EFFICIENCY ASPIRATOR FOR INFLATABLE EMERGENCY SLIDES and whose entire disclosure is incorporated by reference herein.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

FIELD OF THE INVENTION

This invention relates generally to devices for inflating inflatable devices, and more particularly to aspirator assemblies configured for the rapid inflation and deployment of inflatable structures, e.g., evacuation slides, rafts and the like.

BACKGROUND OF THE INVENTION

Many inflation systems are currently available for effecting the rapid inflation of emergency evacuation slides and life-rafts. Such inflation systems typically make use of an aspirator assembly into which a pressurized primary gas, e.g., compressed air, is rapidly introduced through a multi-port nozzle to induce ambient air to be drawn into a hollow chamber in the aspirator assembly via an air-inlet port of the aspirator assembly, whereupon the two gasses combine and flow to a discharge or outlet port of the aspirator assembly. The inlet port includes a check valve, which is automatically opened upon the creation of a partial vacuum in the hollow chamber of the aspirator assembly. The outlet port is in fluid communication with the hollow chamber and is coupled to the structure to be rapidly inflated, e.g., an aircraft evacuation slide, such that the combined gasses exiting the outlet port rapidly inflate the slide. In particular, the rapid introduction of the pressurized primary gas into the nozzle assembly creates a venture effect adjacent the nozzle jets to produce result in partial vacuum within the aspirator assembly chamber. That partial vacuum causes the check valve at the inlet port to open, whereupon ambient air enters into the chamber. When inside the chamber the ambient air mixes with the primary gas in a mixing region of that chamber to generate a combined air-gas flow mixture, which exits the outlet port which is coupled to, e.g., disposed within, the inflatable slide or other structure to be inflated. Thus, the aspirator assembly uses a small volume of compressed air (or other gas) to entrain a relatively large volume of ambient air to inflate an inflatable structure, with the efficiency of the aspirator assembly being expressed by its what is termed its "mass-flow ratio" (the ratio of the volume of primary gas to the volume of ambient air entrained by the aspirator assembly).

The patent literature includes various patents directed to devices for effecting the inflation of evacuation slides, e.g., U.S. Pat. No. 3,598,504 (Siravo); U.S. Pat. No. 3,840,057 (Lesh, Jr.); U.S. Pat. No. 4,368,009 (Heimovics, Jr., et al.); U.S. Pat. No. 6,004,176 (Moran); and U.S. Pat. No. 8,066,493 (Renz et al.)

While prior art aspirator assemblies for effecting the inflation of evacuation slides and the like are generally suitable for their intended purposes, they nevertheless leave something desired from the standpoint of efficiency or mass-flow ratio. As such, a need exists for an aspirator assembly which is more efficient than the prior art and hence can inflate an inflatable structure more quickly than the prior art. The subject invention addresses that need.

All references cited herein are incorporated herein by reference in their entireties.

SUMMARY OF THE INVENTION

One aspect of this invention is an aspirator assembly for inflating inflatable emergency evacuation devices. The aspirator assembly comprises a bell housing, a mixing chamber and a nozzle assembly. The bell housing forms a proximal end of the aspirator assembly and includes an ambient air inlet port at which a check valve is located. The check valve is configured to enable ambient air to enter the ambient air inlet port when the check valve is open. The mixing chamber has a distal portion that includes an outlet port. The mixing chamber is connected to the bell housing and defines a gas flow path between the inlet port and the outlet port. The gas flow path extends along a central longitudinal axis. The outlet port is configured to be coupled to an emergency evacuation inflatable device. The nozzle assembly is located in the mixing chamber and comprises a primary gas inlet port and a plurality of passageway sections. The passageway sections have internal passageways in fluid communication with the primary gas inlet port. The passageway sections include plural nozzle jets extending in a direction toward the outlet port. The passageway sections are of a generally symmetrical cambered top and bottom airfoil shape cross-section comprising a rounded leading end and a tapering trailing end. The leading edge is directed towards the inlet port. The trailing edge is directed toward the outlet port, whereupon pressurized primary gas introduced into the primary gas inlet port flows through the internal passageways to the nozzle jets from which it exits, thereby producing a venturi effect and partial vacuum adjacent the nozzle assembly within the mixing chamber to cause the check valve to open, whereupon ambient air is drawn into the mixing chamber and around the nozzle assembly to the outlet port. The generally symmetrical cambered top and bottom airfoil shape cross-sectional shape of the passageway sections serving to reduce turbulent flow of ambient air around the nozzle assembly.

In accordance with one preferred aspect of the aspirator assembly of this invention, each of the nozzle jets is a tubular member.

In accordance with another preferred aspect of the aspirator assembly of this invention, each of the nozzle jets includes an open free end and a sidewall tapering in thickness toward the free end.

In accordance with another preferred aspect of the aspirator assembly of this invention, plural ones of the passageway sections conjoin with each other to form at least one ring-like structure.

In accordance with another preferred aspect of the aspirator assembly of this invention, plural ones of the passageway sections conjoin with each other to form a first elongated linear structure, and plural ones of the passageway sections form a second elongated linear structure, the first elongated linear structure extending perpendicularly to the second elongated linear structure.

In accordance with another preferred aspect of the aspirator assembly of this invention, the passageway sections are located in a plane extending perpendicularly to the central longitudinal axis.

In accordance with another preferred aspect of the aspirator assembly of this invention, the first elongated linear structure includes an end portion at which the primary gas inlet port is located.

In accordance with another preferred aspect of the aspirator assembly of this invention, the bell housing comprises a ring, a pair of resilient flap sections, and a support member. The ring has an outer surface and a generally planar undersurface. The undersurface forms a valve seat. The support member mounts the flap sections immediately adjacent the ring so that the flap sections are normally in engagement with the valve seat, but which flex upon the existence of the partial vacuum within the mixing chamber to move off of the valve seat.

In accordance with another preferred aspect of the aspirator assembly of this invention, the outer surface of the ring is a rounded convex surface.

In accordance with another preferred aspect of the aspirator assembly of this invention, the resilient flap sections comprise a unitary base member of circular profile and a pair of almost semi-circular sections. The base member has a pair of grooves. Each of the grooves forms a respective flexure line. Each of the almost semi-circular sections has a linear edge and is secured to the base section, with the linear edge being located immediately adjacent a respective one of the flexure lines.

In accordance with another preferred aspect of the aspirator assembly of this invention, the ring includes a central opening and wherein the support member comprises a bar-like member secured within the opening, the base member is fixedly secured to the support member between the flexure lines.

Another aspect of this invention is a nozzle assembly for use in an aspirator assembly for inflating inflatable emergency evacuation devices. The aspirator assembly has a proximal end including an ambient air inlet port and a check valve, a mixing chamber, and a distal end having an outlet port. The mixing chamber defines a gas flow path between the inlet port and the outlet port. The nozzle assembly has a longitudinal axis and comprises a primary gas inlet port, and a plurality of passageway sections. The passageway sections have internal passageways in fluid communication with a primary gas inlet port for receipt of a pressurized primary gas. The passageway sections include plural nozzle jets extending in a first direction parallel to the longitudinal axis. The passageway sections are of a generally symmetrical cambered top and bottom airfoil shape cross section comprising a rounded leading end and a tapering trailing end. The leading end is directed in a second direction opposite to the first direction. The trailing end is directed in the first direction. The nozzle assembly is configured whereupon pressurized primary gas introduced into the primary gas inlet port flows through the internal passageways to the nozzle jets from which it exits.

In accordance with one preferred aspect of the nozzle assembly of this invention, each of the nozzle jets is a tubular member.

In accordance with another preferred aspect of the nozzle assembly of this invention, each of the nozzle jets includes an open free end and a sidewall tapering in thickness toward the free end.

In accordance with another preferred aspect of the nozzle assembly of this invention, plural ones of the passageway sections conjoin with each other to form at least one ring-like structure.

In accordance with another preferred aspect of the nozzle assembly of this invention, plural ones of the passageway sections conjoin with each other to form a first elongated linear structure, and plural ones of the passageway sections form a second elongated linear structure. The first elongated linear structure extends perpendicularly to the second elongated linear structure.

In accordance with another preferred aspect of the nozzle assembly of this invention, the passageway sections are located in a plane extending perpendicularly to the central longitudinal axis.

In accordance with another preferred aspect of the nozzle assembly of this invention, the first elongated linear structure includes an end portion at which the primary gas inlet port is located.

Still another aspect of this invention is a bell housing for use in an aspirator assembly for inflating inflatable emergency evacuation devices. The aspirator assembly comprises a mixing chamber, a nozzle assembly, and a distal end having an outlet port. The mixing chamber defines a gas flow path between an inlet port and the outlet port. The nozzle assembly is configured to introduce a pressurized primary gas into the mixing chamber. The bell housing is configured to form a check valve for an inlet port of the aspirator assembly and comprises a ring, a support member and a pair of resilient flap sections. The ring has an outer surface and a generally planar undersurface. The undersurface forms a valve seat. The pair of resilient flap sections are mounted immediately adjacent the ring by the support member, whereupon the flap sections are normally in engagement with the valve seat, but which flex upon the existence of a partial vacuum within the mixing chamber to move off of the valve seat.

In accordance with one preferred aspect of the bell housing of this invention, the outer surface of the ring is a rounded convex surface.

In accordance with another preferred aspect of the bell housing of this invention, the resilient flap sections comprise a unitary base member of circular profile and a pair of almost semi-circular sections. The base member has a pair of grooves. Each of the grooves forms a respective flexure line. Each the almost semi-circular sections has a linear edge and is secured to the base section, with the linear edge being located immediately adjacent a respective one of the flexure lines.

In accordance with another preferred aspect of the bell housing of this invention, the ring includes a central opening and wherein the support member comprises a bar-like member secured within the opening. The base member is fixedly secured to the support member between the flexure lines.

BRIEF DESCRIPTION OF THE DRAWING FIGURES

FIG. 1 is an isometric view of one exemplary embodiment of an aspirator assembly for inflating an inflatable emergency slide, e.g., an aircraft evacuation slide;

FIG. 2 is an isometric view similar to FIG. 1, but showing the exemplary embodiment of FIG. 1 from the opposite side;

FIG. 3 is an is isometric view similar to FIG. 1, but with a portion of the aspirator assembly omitted so that a nozzle assembly which is located within the aspirator assembly can be readily seen;

FIG. 4 is an enlarged isometric view of the nozzle assembly shown in FIG. 3;

FIG. 5 is an isometric view similar to FIG. 4, but taken from the opposite side of the nozzle assembly;

FIG. 6 is an enlarged sectional isometric view of the nozzle assembly taken along lines 6-6 of FIG. 5;

FIG. 7 is an enlarged front elevational view of the nozzle assembly shown in FIGS. 3-6;

FIG. 8 is an enlarged sectional view taken along line 8-8 of FIG. 7;

DETAILED DESCRIPTION OF THE PREFERRED EMBODIMENTS

Figure 9:
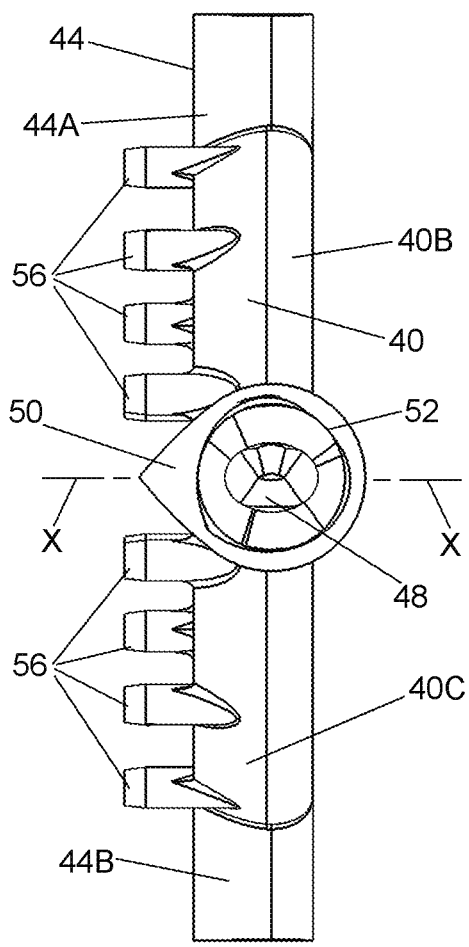
FIG. 9 is a slightly reduced side elevational view taken along line 9-9 of FIG. 7.

Referring now to the drawings wherein like characters refer to like parts there is shown at 20 in FIG. 1 one exemplary embodiment of an aspirator assembly constructed in accordance with this invention. The aspirator assembly 20 is configured so that it can be used in a similar manner to prior art aspirator assemblies to effect the rapid inflation of emergency evacuation slides, life-rafts or other inflatable emergency evacuation devices. However, the aspirator assembly of the subject invention is more efficient than prior art aspirator assemblies due to the construction of various of its components Like prior art aspirator assemblies, the aspirator assembly 20 of this invention basically comprises an aspirator body 22, a bell housing 24 and a nozzle assembly 26 (FIG. 3). The aspirator body is very similar to that of the prior art, whereas the bell housing and the nozzle assembly are considerably different, as will be described later.

Turning now to FIGS. 1-3, the details of the aspirator body 22 will be discussed. As can be seen the body 22 is a hollow tubular member having a central longitudinal axis X and is composed of a main section 28 and an extension section 30. The main section 28 comprises a sidewall of cylindrical shape and constant diameter. The extension section 30 is fixedly secured to the main section and is also of cylindrical shape. However, the section 30 includes three portions 30A, 30B and 30C, whose respective sidewalls are of different shapes. In particular, the sidewall of the proximal end portion 30A is cylindrical and configured to be received within the distal end of the sidewall of the main section 28 to secure the extension section to the main section. The sidewall of the intermediate portion 30B of the extension section is also cylindrical, but flares outward at a slight angle with respect to the longitudinal axis X in the distal direction from the portion 30A. The sidewall of the distal end portion 22C of the extension section is also cylindrical, but flares outward at a greater angle with respect to the longitudinal axis X in the distal direction from the intermediate portion 30B. The free end of the section 30C is open and forms the outlet port 32 of the aspirator assembly 22. As is conventional, the outlet port 32 is configured to be located within an inflatable slide (not shown), life-raft (not shown), or other inflatable emergency evacuation device to effect the rapid inflation thereof.

The bell housing 24 is mounted at the proximal end of the main section 28 of the aspirator body 22. The details of the bell housing 24 will be described later. Suffice it for now to state that the bell housing forms the inlet port 34 of the aspirator assembly 20. A check valve 36 (FIGS. 1 and 5), which forms a portion of the bell housing, and which includes a pair of flap sections 38A and 38B, is located at the inlet port 34. The check valve is configured such that when it is opened it enables ambient air to flow through the inlet port into the interior of the aspirator body. A portion of the interior of the aspirator body forms a mixing chamber in which a compressed gas, e.g., air, is introduced to mix with ambient air drawn through the inlet port such that the mixed gas exits the outlet port 32 to effect the inflation of the evacuation device.

Turning now to FIGS. 4-11, the details of the nozzle assembly 26 will now be described. The nozzle assembly 26 serves as the means for injecting the compressed gas into the mixing chamber. The nozzle assembly basically comprises a concentric ring-like, cross-braced member made up of plural conjoined passageway sections including internal passageways and plural nozzle jets in fluid communication with the internal passageways. In particular, as best seen in FIGS. 4, 5 and 7 the nozzle assembly comprises an outer ring 40, an inner ring 42, a linear section 44, and a linear section 46. The inner ring 42 is located centered within the outer ring 40. The linear sections 44 and 46 intersect and extend perpendicularly to each other to serve as a cross brace for mounting the nozzle assembly within the main section 28 of the aspirator body. To that end, the linear section 44 is composed of two coplanar half passageway sections 44A and 44B which are conjoined to each another. In a similar manner, the linear section 46 is composed of two coplanar half passageway sections 46A and 46B which are conjoined to each other. The outer ring 40 composed of four coplanar quarter ring passageway sections 40A, 40B, 40C and 40D which are conjoined with one another. Similarly, the inner ring 42 is composed of four coplanar quarter ring passageway sections 42A, 42B, 42C and 42D which are conjoined with one another.

Figure 10:
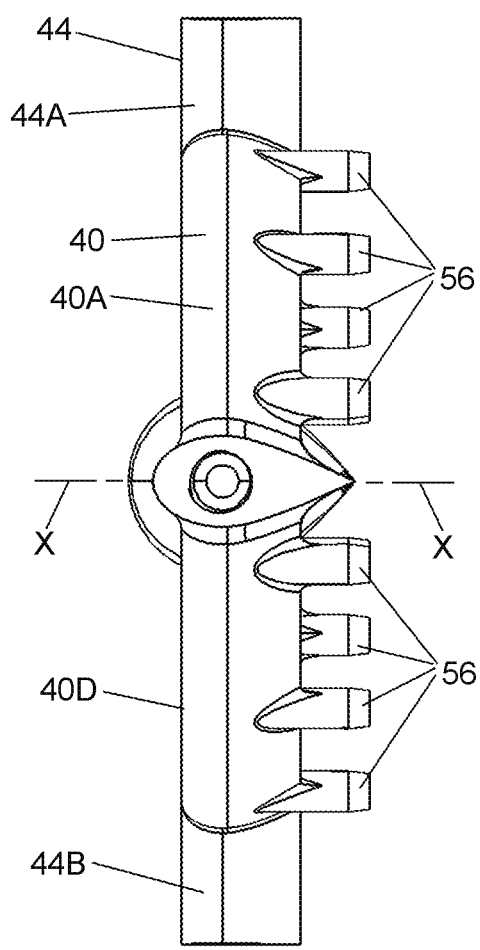
FIG. 10 is a slightly reduced side elevational view taken along line 10-10 of FIG. 7.

As best seen in FIGS. 9 and 10 all of the passageway sections 40A-46B of the nozzle assembly lie in a common plane, which is perpendicular to the longitudinal axis X. Each of the passageway sections 40A-46B includes an internal passageway 48 extending therethrough, with the passageways of each of those passageway sections being in fluid communication with each other. The end of the passageway 48 in the passageway section 46B forms the primary gas inlet port of the nozzle assembly. In particular, the end portion of the passageway section 46B is in the form of an enlarged head 50 having an internally threaded opening 52 which is internally threaded and is configured to be connected via a conventional threaded connector (not shown) to a source of compressed primary gas (not shown).

Thus, the compressed primary gas introduced into the gas inlet port 52 will flow down through all of the interconnected internal passageways 48 to all of the nozzle jets.

As best seen in FIGS. 5 and 6, the end of the internal passageway 48 in the passageway section 46A is in the form of an internally threaded opening 54. The internally threaded opening 54 is configured to receive a threaded fastener (not shown) for mounting the nozzle assembly 22 within the main section 28 of the aspirator body. The ends of the passageways 48 in the passageway sections 44A and 44B are also each in the form of an internally threaded opening 54 that is configured to receive a respective threaded fastener (not shown) for mounting the nozzle assembly 22 within the main section 28 of the aspirator body.

Each of the conjoined passageway sections 40A-46B includes at least one nozzle jet 56. Thus, as best seen in FIG. 7 the nozzle jets of the outer ring 40 are equidistantly spaced in a circle from one another. The nozzle jets of the inner ring 42 coupled with the nozzle jets of the linear section 44 are also equidistantly spaced in a circle from one another. It should be point out at this juncture that the number and location of the nozzle jets can be modified if desired, depending up the application to which the aspirator assembly of this invention is to be put. Thus, the particular configuration and arrangement of the nozzle jets as shown and described heretofore is merely exemplary of various possible arrangements and configurations.

In any case, as best seen in FIG. 8, each nozzle jet is a hollow tubular member having a central passageway 58 (Fig. lie in a plane extending perpendicular to the longitudinal axis X. Each of the nozzle jets 34 is a tubular member having an open free end 58, and a central passageway 60 extending from the passageway 48 in the associated passageway section to the open free end. The nozzle jets extend parallel to the longitudinal axis X and face towards the outlet port 28 of the mixing chamber when the nozzle assembly is mounted within the aspirator body.

The introduction of the compressed primary gas into the gas inlet port 50 causes that gas to flow through the internal passageways 48 in the passageway sections 40A to 46B and out through the open free ends 58 of the nozzle jets 56. That action creates a venturi effect adjacent the nozzle jets, whereupon a partial vacuum results within the mixing chamber. That partial vacuum is sufficient to cause the check valve 36 to open very quickly, i.e., the ambient air pressure outside of the aspirator assembly is greater than the cracking pressure of the valve, whereupon the check valve's flap sections 38A and 38B flex inward so that ambient air is drawn into the mixing chamber. That ambient air mixes with the compressed air exiting the nozzle jets to create an air flow path from the inlet port 34 to the outlet port 32, whereupon the mixed air exits the outlet port to result in the rapid inflation of the evacuation device.

Figure 11:
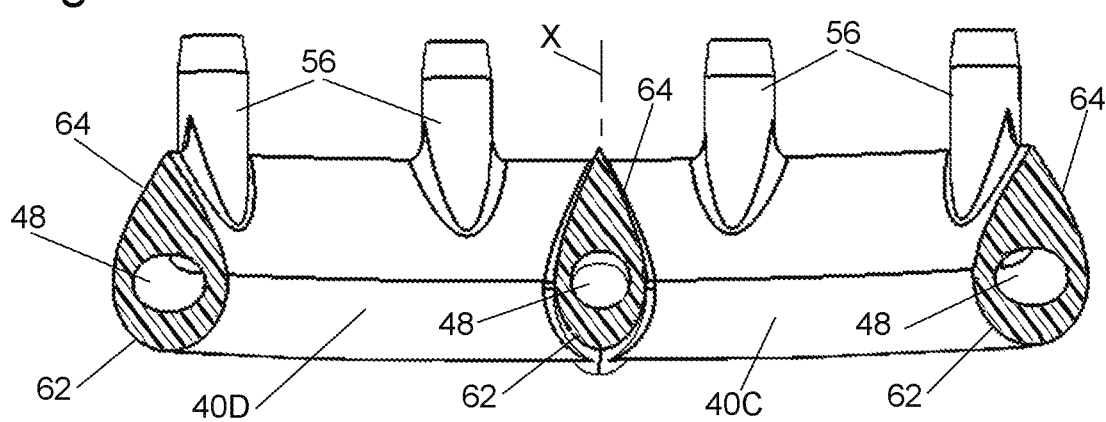
FIG. 11 is an enlarged sectional view taken along line 11-11 of FIG. 7.
Figure 12:
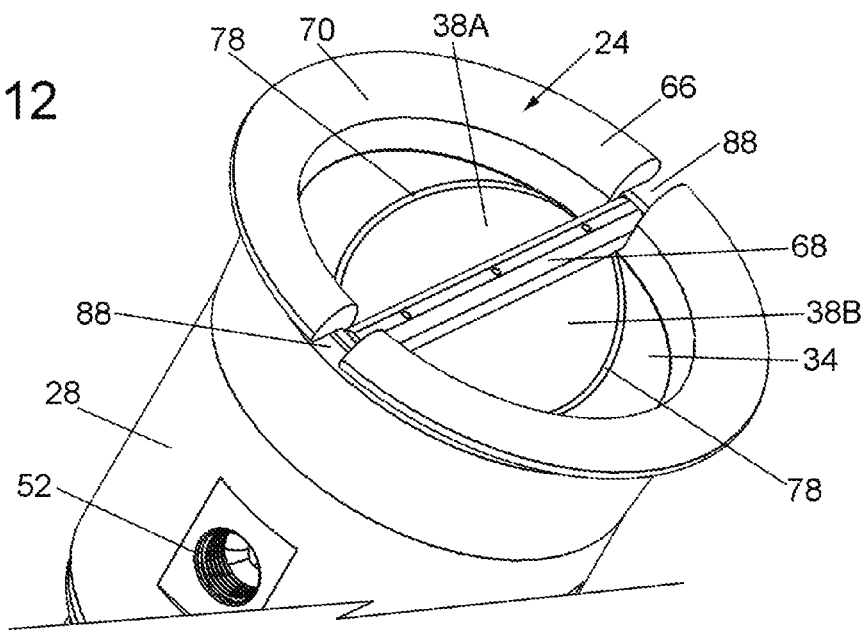
FIG. 12 is an enlarged isometric view of the proximal end of the aspirator assembly shown in FIG. 1, illustrating the ingress of ambient air into the bell housing of the aspirator assembly during its operation.
Figure 13:
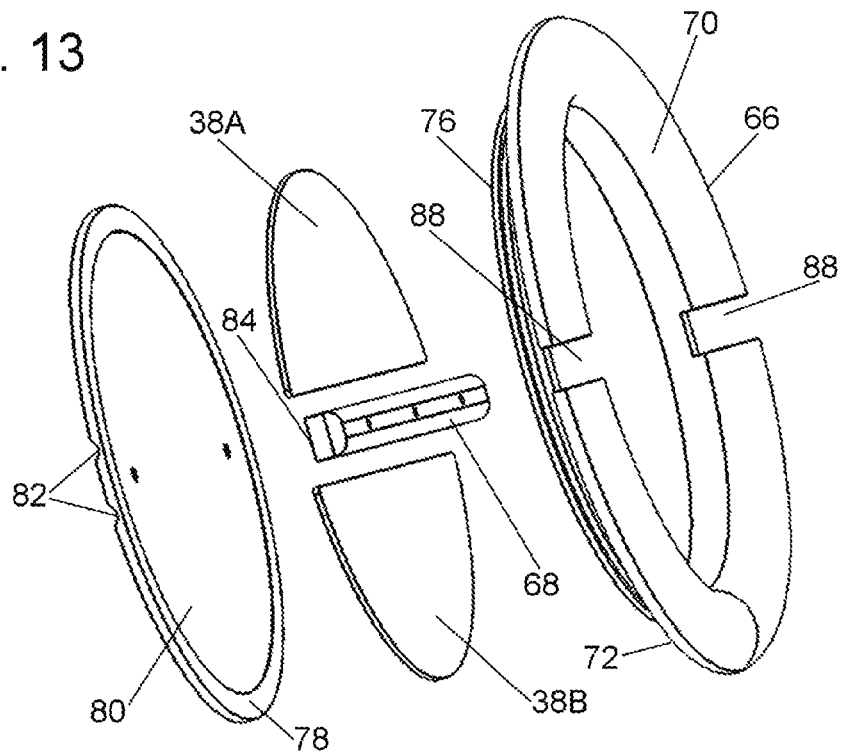
FIG. 13 is an enlarged exploded isometric view of the components making up the bell housing shown in FIG. 12.
Figure 14:
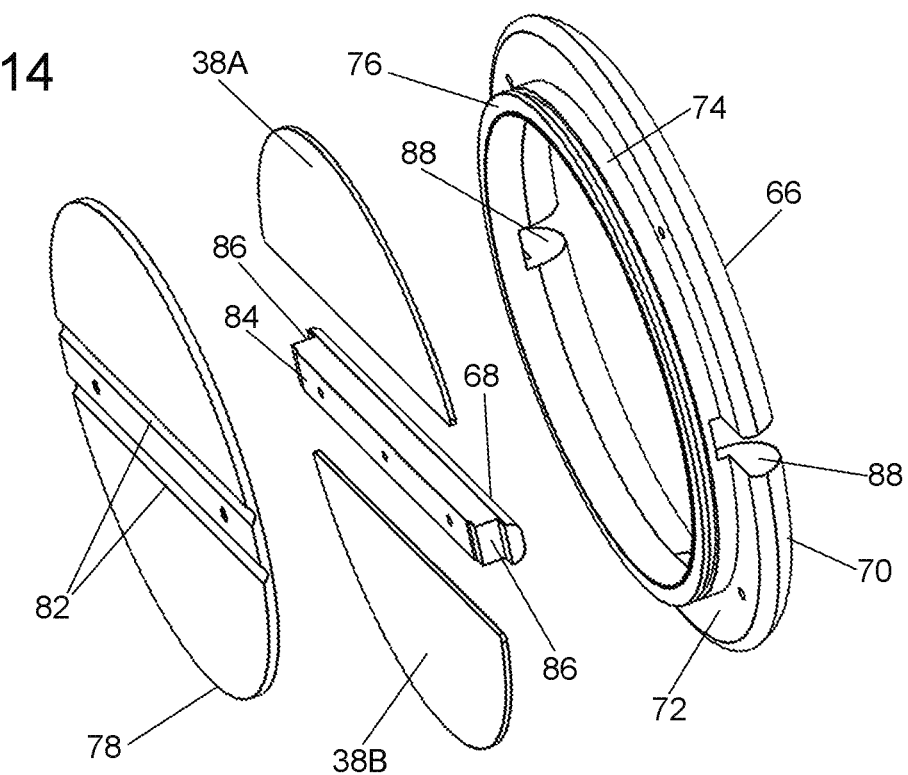
FIG. 14 is an enlarged exploded isometric view of the components making up the bell housing shown in FIG. 12, but taken from an opposite direction.
Figure 15:
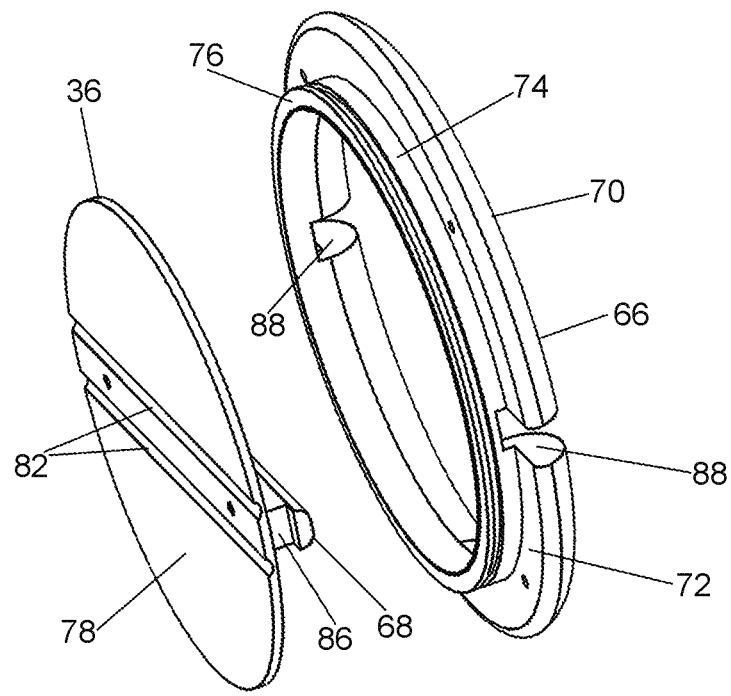
FIG. 15 is another enlarged exploded isometric view of the components making up the bell housing shown in FIGS. 13 and 14, with some of those components shown in their assembled state.

As mentioned earlier, the cross sectional shape of the passageway sections 40A-46B of the nozzle assembly is particularly chosen to result in optimal air flow effects adjacent the nozzle assembly as the ambient air is mixed with the compressed air in the flow path. By so doing, the nozzle assembly is able to operate more efficiently than conventional nozzle assemblies. In particular, the cross sectional shape of the passageway sections 40A-46B making up the nozzle assembly are all of identical cross sectional shape. That shape, is best seen in FIG. 11 and is a generally symmetrical cambered top and bottom airfoil shape that comprises a rounded leading end 62 facing the inlet port 34, and a tapering trailing end 64 facing the outlet port 32. Being of an airfoil like shape there will be reduced air turbulence around the nozzle assembly. The effect of reduced turbulence renders the nozzle assembly approximately twenty-three percent more efficient than prior art nozzle assemblies. As will be appreciate by those skilled in the art, such an increased efficiency will result in faster inflation of the inflatable evacuation device to which the aspirator of this invention is connected.

In accordance with one preferred embodiment of this invention, the thickness of the sidewall making up each nozzle jet 56 tapers downward at a shallow angle, e.g., 7 degrees to the longitudinal axis of the passageway 60, in the direction toward the free end 58 of the nozzle. This taper results in both increasing the speed at which the compressed primary gas exits the nozzle jets, and also optimizing the amount of gas turbulence in the vicinity of the nozzle jets.

Turning now to FIGS. 12-15, the details of the bell housing 24 will now be described. The bell housing basically comprises housing comprises a ring 66, the heretofore mentioned pair of resilient flap sections 38A and 38B, and a support member 68. The ring includes a central opening which forms the heretofore identified inlet port 34, curved proximal (outer) surface 70 (FIG. 13) and a generally planar inner or undersurface 72 from which an annular wall 74 projects. The inner surface of the annular wall 74 is flush with the central opening 34. The undersurface 76 of the annular wall forms the valve seat of the check valve 36. The outer surface of the annular wall is configured to fit within the open end of the main body section 28 of the aspirator body to mount the bell housing and the check valve thereon.

The check valve is formed of the heretofore two flap sections 38A and 38B, which are mounted on respective portions of a resilient disk-shaped member 78. The disk-shaped member 78 is configured to flex into and out of engagement with the valve seat to close and open the check valve. To that end the disk-shaped member 78 is formed of a resilient material, e.g., metal with a rubberized coating to create the seal with the valve seat, and is of circular profile, the outer diameter of which is equal to the outer diameter of the valve seat 76. The distal surface of the disk-shaped member 78 includes a circular recess 80 configured to receive the two almost semi-circular flap sections 38A and 38B. The undersurface of the disk-shaped member 78 includes a pair of linear grooves 82 extending across a central portion of the disk-shaped member. The grooves 82 form respective flexure or hinge lines about which portions of the disk-like member 78 can flex. The spacing the grooves serves as connection area for mounting the disk-shaped member onto the support member 68. The support member 68 is a bar-like member which includes a planar undersurface 84 which engages the bottom surface of the circular recess 80 between the two linear grooves 82. Plural fasteners (not shown) are provided to extend through holes in the support member 68 and the disk-shaped member to fixedly secure the disk-shaped member to it. Each end of the support member includes a notch 86, which is configured to be received within a correspondingly shaped slot 88 in the ring 66 to mount the support member to the ring, with the movable valve element made up by the disk-shaped member 78 being located within the inlet port 34.

Each of the two flap sections 38A and 38B is of a profile which is almost semi-circular in shape to fit within respective portions of the circular recess 80 on either side of the support member 68. In particular, each flap member includes a circular portion of less than 180 degrees and a linear section connecting the ends of the circular portion. The flap members are permanently secured within their respective portions of the circular recess 80 by any suitable means, e.g., an adhesive, and are preferably sufficiently thin so that they are flush with the top or proximal surface of the disk-shaped member surrounding the circular recess when they are mounted therein. Due to the natural resiliency of the material making up the disk-shaped member 78, the portion of the upper (proximal) surface of that member which surrounds the circular recess 80 will normally be in engagement with the valve seat and the check valve will thus be normally closed. Preferably, the flap sections 38A and 38B are formed of any suitable material to provide some degree of rigidity to the portions of the disk-shaped member 78 to which they are secured to ensure that there is good engagement of the disk-shaped member with the valve seat when the valve is closed. The disk-shaped member is configured to readily flex along the flexure lines 82 when the cracking pressure of the check valve has been exceeded, whereupon the upper surface portions of the disk-like member surrounding the circular recess 80 move out of engagement with the valve seat and the valve opens. That action occurs, as noted earlier, when the compressed primary gas is introduced into the nozzle assembly. The natural resiliency of the material making up the disk-shaped member 78 will cause it to automatically flex back to its generally planar state, when the air pressure within the mixing chamber is below the cracking pressure of the check valve. This action is important, since once the aspirator assembly of this invention has inflated the inflatable evacuation device and the source of the compressed primary gas shut off, the valve should quickly close to prevent deflation of the inflatable evacuation device.

As should be appreciated by those skilled in the art, the rounded or arcuate shape of the outer (proximal) surface 70 of the ring 66, and the rounded or arcuate shape of the outer (proximal) surface of the support member, results in less air turbulence at the inlet port. That action also increases the efficiency of the aspirator assembly of this invention. In this regard, those portions of the bell housing enable an increase in efficiency of approximately seven percent. Thus, the bell housing constructed in accordance with this invention, when used in conjunction with a nozzle assembly constructed in accordance with this invention can result in an efficiency improvement of approximately thirty percent as compared to the prior art.

It should be pointed out at this juncture that the device 20 as described above is merely exemplary of various components and arrangements that can be used to achieve the ends of this invention. Moreover, while the device of this invention has been described in the context of use with inflatable emergency evacuation devices, it should be noted that that is merely exemplary. Thus, the device of this invention can be used with any inflatable device to inflate it. Thus devices other than that specifically described above can be constructed in accordance with the teaching of this invention.

Without further elaboration the foregoing will so fully illustrate my invention that others may, by applying current or future knowledge, adopt the same for use under various conditions of service.

I claim:

1. A nozzle assembly for use in an aspirator assembly for inflating inflatable emergency evacuation devices, the aspirator assembly including an ambient air inlet port, an outlet port, a mixing chamber, and a check valve, the mixing chamber defining a gas flow path between the ambient air inlet port and the outlet port, said nozzle assembly having a longitudinal axis and comprising:

a brace configured for mounting said nozzle assembly within the mixing chamber, said brace comprising two linear sections which intersect perpendicularly to each other to form a cross brace, each of said linear sections comprising two coplanar half sections which are conjoined to each other, one of said linear sections including a first end and a second end, said first end including a threaded opening, said second end including a threaded opening, each of said threaded openings being configured for receipt of a threaded fastener to mount said nozzle assembly within the mixing chamber, the other of said linear sections including a third end and a fourth end, said third end including a threaded opening configured for receipt of a threaded fastener to mount said nozzle assembly within the mixing chamber;

a primary gas inlet port located at said fourth end and configured to receive a pressurized primary gas; and a concentric ring-like member comprising an outer ring and an inner ring, said inner ring being located centered in said outer ring, each of said rings comprising a plurality of conjoined passageway sections, said passageway sections lying in a plane perpendicular to said longitudinal axis and having internal passageways in fluid communication with said primary gas inlet port for receipt of the pressurized primary gas therein, said passageway sections including plural nozzle jets, each of said nozzle jets being a hollow tubular member extending in a first direction parallel to said longitudinal axis and perpendicular to said plane and having an open free end spaced from said passageway sections, said passageway sections being of a generally symmetrical cambered top and bottom airfoil shape cross section comprising a rounded leading end and a tapering trailing end, said leading end being directed in a second direction opposite to said first direction, said trailing end being directed in said first direction, said nozzle assembly being configured whereupon when the pressurized primary gas is introduced into said primary gas inlet port the pressurized primary gas flows through said internal passageways to said nozzle jets from which it exits said open free ends to create a venturi effect and partial vacuum adjacent said nozzle jets to cause the check valve to open, whereupon ambient air is drawn from the ambient air inlet port past said the check valve, into said the mixing chamber and out of said the outlet port.

2. The nozzle assembly of claim 1, wherein each of said tubular members includes a sidewall tapering in thickness toward said free end.

3. The nozzle assembly of claim 1, wherein said primary gas inlet port comprises a threaded opening.

4. The nozzle assembly of claim 1, wherein each of said threaded openings is internally threaded.

* * * * *